March 13, 1945.  C. BEST ET AL  2,371,126
APPARATUS FOR FEEDING ARTICLES FROM A SUPPLY
Filed Nov. 21, 1941  6 Sheets-Sheet 5

Inventor
Cyril Best
Samuel R. Chown
By
Watson, Cole, Grindle & Watson
Attys.

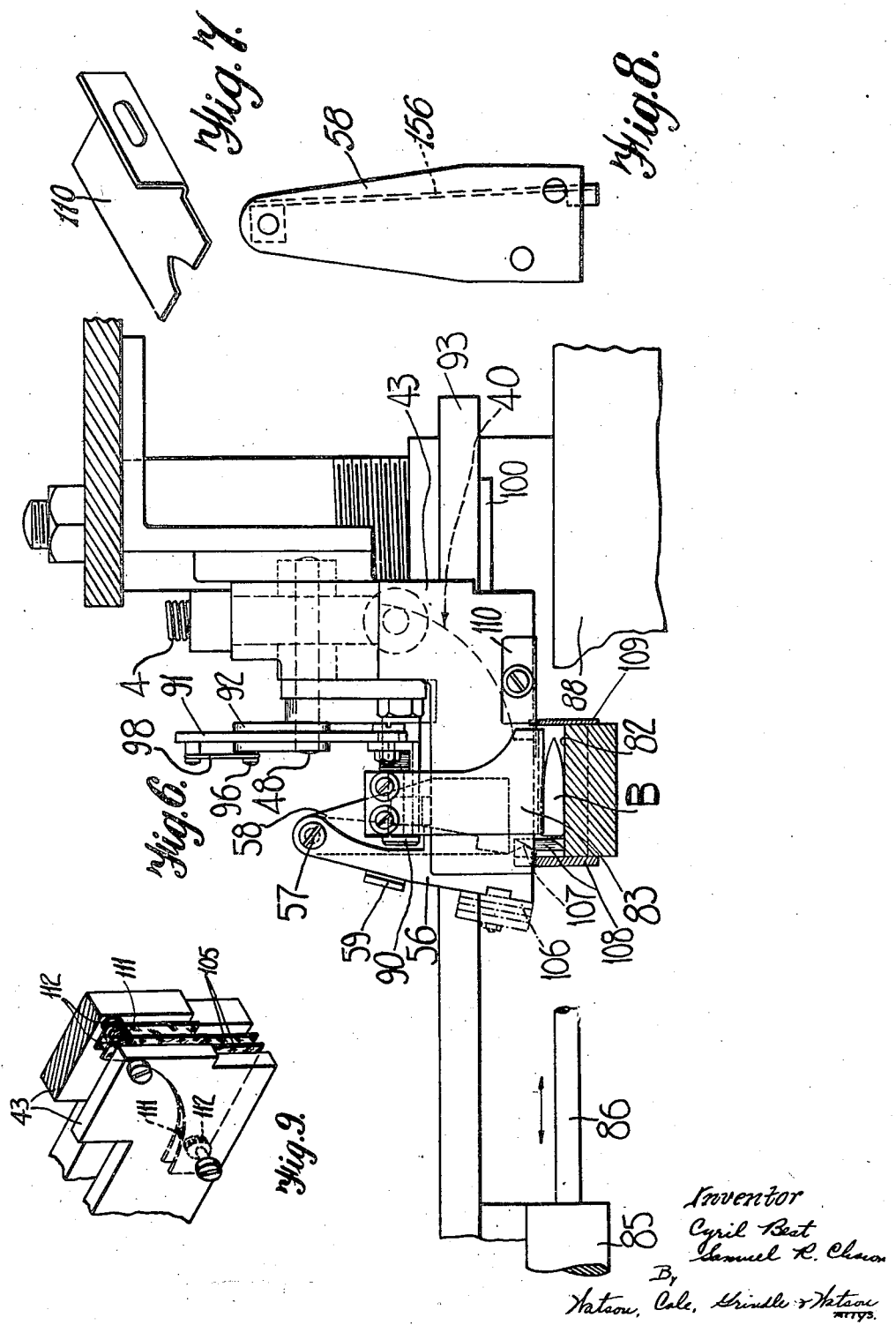

Patented Mar. 13, 1945

2,371,126

UNITED STATES PATENT OFFICE 2,371,126

APPARATUS FOR FEEDING ARTICLES FROM A SUPPLY

Cyril Best and Samuel Robert Chown, Deptford, London, S. E. 8, England, assignors to Molins Machine Company, Limited, London, S. E. 8, England Application November 21, 1941, Serial No. 420,010
In Great Britain December 4, 1940

17 Claims. (Cl. 29—1.22)

This invention concerns improvements in or relating to apparatus for feeding articles in succession and changing their direction abruptly, for example apparatus for feeding bullets from a container to weighing or other testing apparatus or to a machine (e. g., a rectifying machine) where the bullet is subjected to further manufacturing operations.

According to the invention there is provided apparatus for feeding articles wherein articles moving in succession along a path are successively caused to strike against a stop and each article is thereafter caused to move between guides in a direction transverse to the first said path before the arrival of the next succeeding article, and wherein the stop comprises a shock absorber in the path of the article moving in the first said path. The shock absorber tends to reduce bouncing of the articles when they are stopped and thus assists in bringing the articles to rest more accurately opposite the opening through which they must pass between said guides.

The shock absorber may comprise a pivoted depending weight or a resiliently mounted member.

Further according to the invention there is provided apparatus as set forth above, adapted and arranged to feed articles comprising a shell and a core (e. g., bullets of the kind comprising an envelope and a soft core) so that the exposed ends of the cores are fed foremost, wherein the shock absorber is so shaped (e. g., conical or wedge shaped) that it is adapted to engage the cores of oncoming articles. The shock absorber may be arranged to enter the shell of an empty or incomplete article and to hold such article out of alignment with the opening between said guides. A pusher element may be provided and arranged to move articles in the said transverse direction and an interrupter device (e. g., a clutch) may be arranged to prevent the full feeding movement of the pusher element should an article be out of alignment with the said guides. The article fed by the said pusher element may be caused to lie in the path of a plunger moving in timed relationship with the pusher element, and locating means may be provided adapted to be operated in timed relationship with said plunger and positively and accurately to locate an article in the path of the plunger.

The articles may be caused to fall down a tube and move over a curved guide comprising thin spaced rails or other thin spaced guides on which the articles slide. By providing spaced rails for the previously known and used solid curved guide surface, variations in the rate at which the articles travel down the curved guide can be reduced. The rails or other guides may be arranged in openwork formation by mounting them with distance-pieces between the rails and the walls of the rail supporting devices. This openwork formation permits any foreign matter to fall through the spaces left between the rails or between the rails and the side walls, thus enabling increased output to be obtained due to fewer stoppages.

Examples of apparatus made in accordance with the invention will now be described with reference to the accompanying drawings in which—

Figure 6 is an end elevation of Figure 5 taken in the direction of the arrow E.

Figure 7 shows a detail.

Figure 8 shows a modified form of shock absorber.

Figure 9 shows a perspective view of the guide rails.

Figure 1:
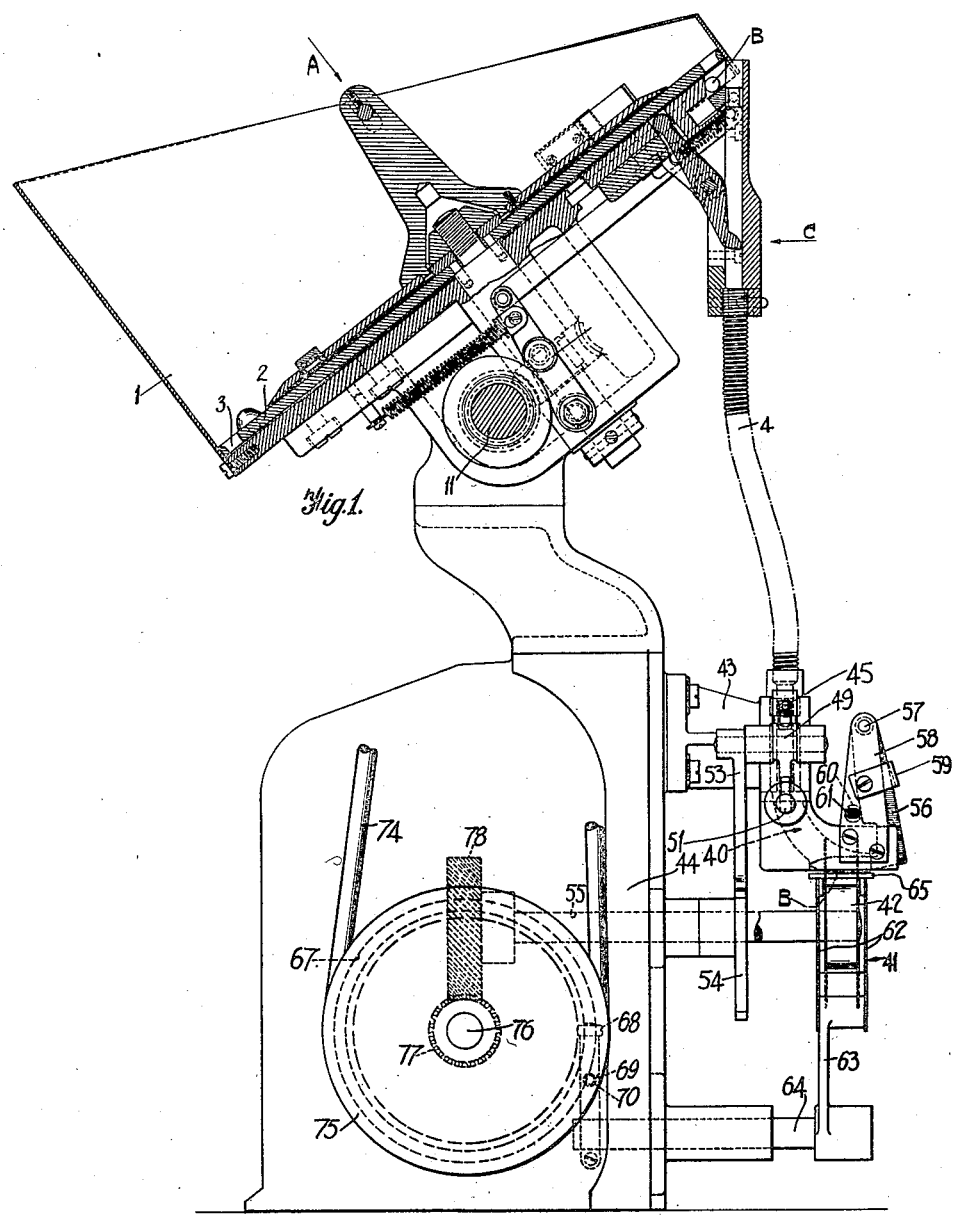
Figure 1 is a side elevation partly in section of an apparatus for feeding bullets to a weighing machine.
Figure 2:
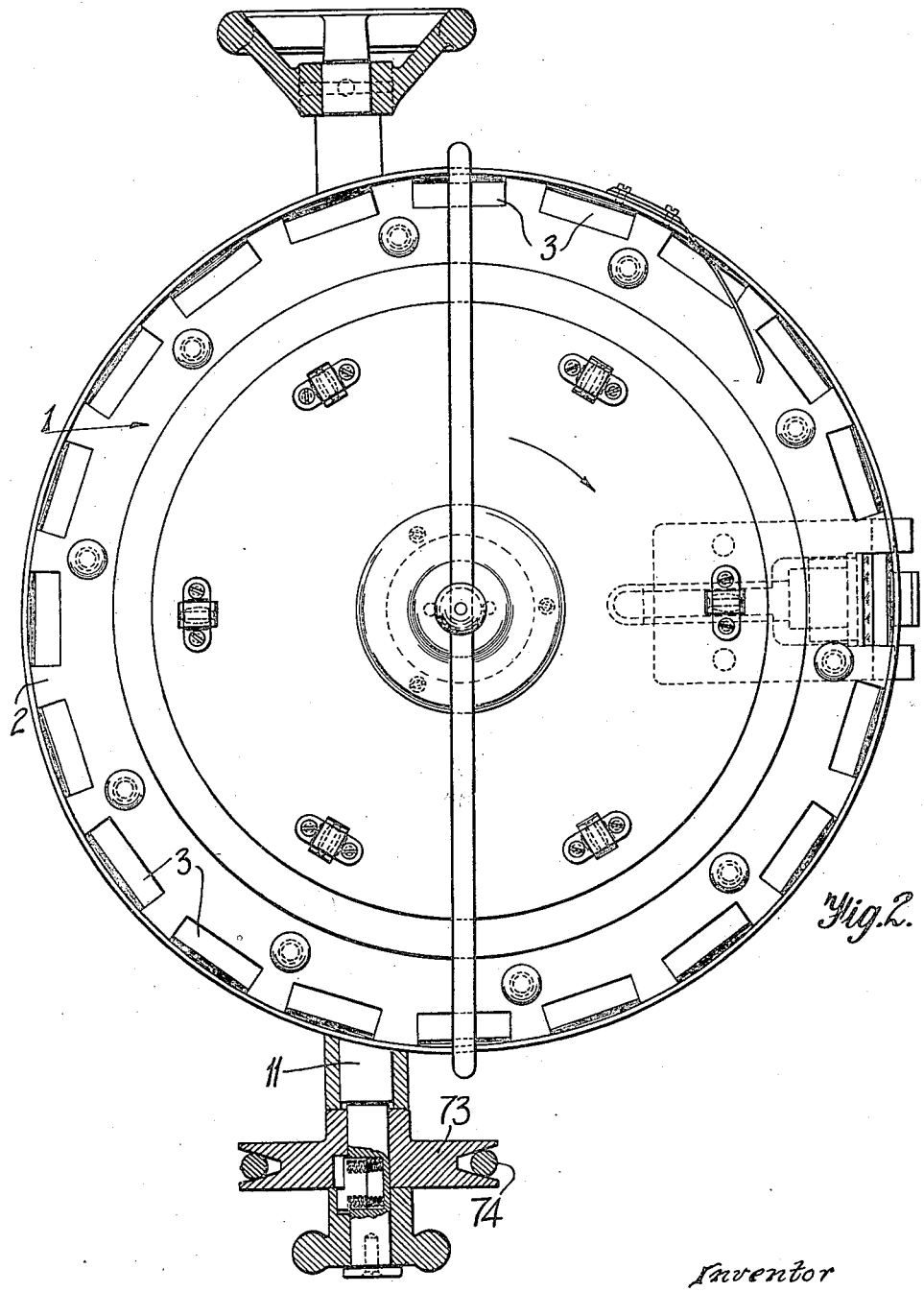
Figure 2 is a view of Figure 1 in the direction of the arrow A.
Figure 3:
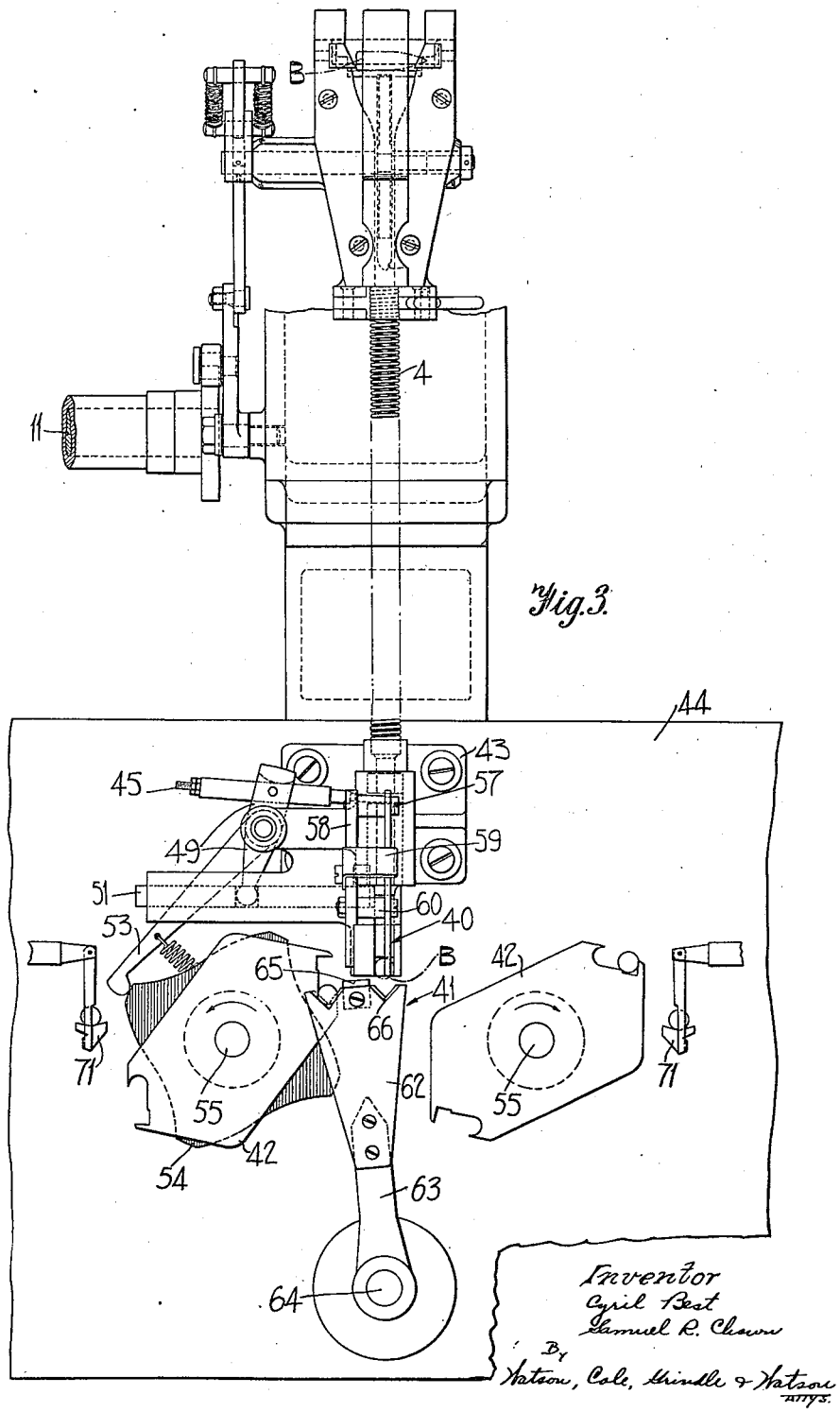
Figure 3 is a view of part of Figure 1 in the direction of the arrow C.

Referring to Figures 1 to 3, the bullets B which are to be weighed are deposited into a circular hopper 1 having a rotating bottom plate 2, the hopper being inclined to the horizontal plane as shown in Figure 1. The bottom plate of the hopper is provided with slots 3 into which bullets fall from the mass in the hopper as the bottom plate rotates and by which the bullets are delivered one at a time into a downwardly directed passage formed by a flexible tube 4. This hopper is of known form and is arranged to feed the bullets base first down the tube 4.

The tube 4 extends downwardly to a fixed curved guide passage 40 which comprises an extension of the passage 4 and which is arranged to deflect the falling bullets into a horizontal plane where they are delivered on to a rocking feed member 41 which transfers the bullets one at a time to a conveyor member 42 adapted to deliver a bullet to the scale pan of a weighing apparatus in the manner described below. The bullets fall through the passage 4 and its extension due to the force of gravity.

In order to control the bullets as they fall down the passage 4, movable abutments 45 and 51 on a double arm lever 49 are provided at different levels which periodically project in a known way into the passage 4 and check the bullets in their fall. The lever 49 is rocked by a cam lever 53 actuated by a cam 54. As the cam 54 rotates, the rods 45 and 51 alternately enter the passage 4 and while the upper rod checks a bullet, the lower rod permits the bullet in advance of said checked bullet to fall down into the curved extension passage 40 to assume a horizontal position.

At the outlet end of the extension passage 40 there is provided a stop in the form of a shock absorber which is adapted to arrest the moving bullets and to determine their position relatively to the rocking feed member 41. The shock absorber is provided because if the moving bullets are arrested by a rigid member, it sometimes happens that the bullets bounce back from impact therewith and do not lie properly on the rocking feed member 41 but, due to the aforesaid bouncing, lie partly in the extension passage 40. When this occurs the conveyor member does not function properly and sometimes causes jamming up of the feeding mechanism.

As shown, the shock absorber comprises a pivoted depending weight constituted by a lever 56 which is adapted to swing under the impact of the bullet striking against it. The lever is pivoted at 57 to a bracket 58 fixed to a bracket 43.

The lever is controlled by a back stop 59 consisting of an angle piece and a front cylindrical stop 60 which can be adjusted in a slot 61 in the bracket 58. The rocking feed member 41 consists of two thin plates 62 fixed to a lever 63 which is fixed to a spindle 64 journalled in the frame 44 of the weighing apparatus. At the top of the feed member there is fixed a platform 65 while on either side of the platform V grooves 66 are made in the plates 62 to receive the bullets. The member 41 is oscillated by a cam 67 contained within the frame of the weighing apparatus in such manner that a moving bullet is first received on the platform 65 and as the member continues its oscillation the bullet rolls into one set of V grooves and on the return movement a further bullet falls on to the platform and from thence into the other set of V grooves. The cam 67 co-operates with a roller 68 on a lever 69 fixed on the spindle 64. A spring 70 presses the roller against the cam.

The conveyor members rotate in timed relationship with the oscillations of the rocking feed member and remove the bullets therefrom and transfer them to scale pans 71. The conveyor members and the weighing devices are fully described in United States application Serial No. 330,227, now Patent No. 2,329,975, issued September 21, 1943, and need no further description here.

The hopper mechanism is driven from a spindle 11 which has a pulley 73, Figure 2, attached to one end, on which is mounted a belt 74 which also passes around a pulley 75 fixed on the mainshaft 76 of the weighing machine. The mainshaft 76 carries the cam 67 previously mentioned and has also fixed thereto spiral gears 77 which mesh with larger spiral gears 78, fixed to the spindles 55 of the transfer devices 42.

Figure 4:
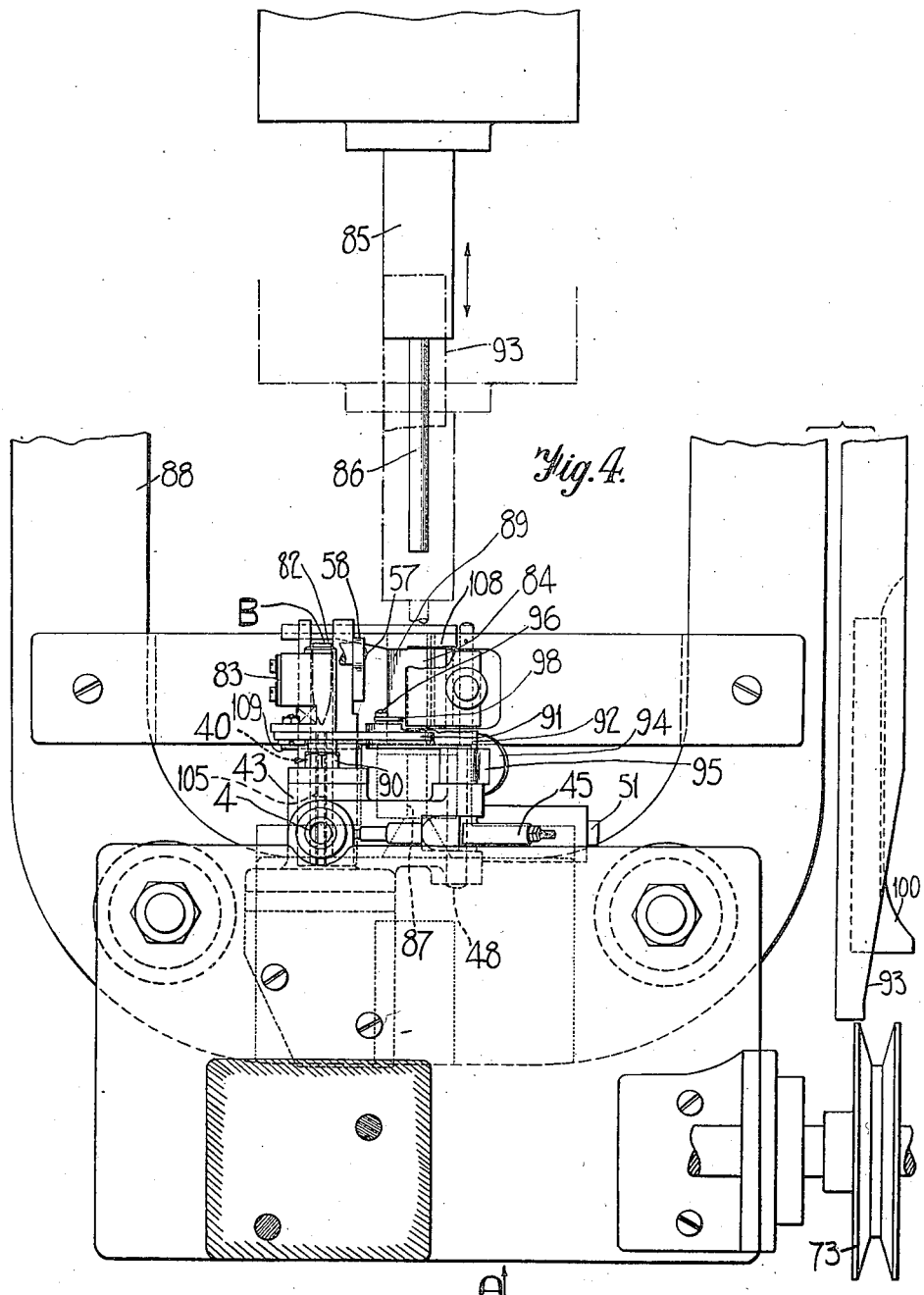
Figure 4 is a plan view of part of a bullet rectifying machine to which the invention is applied, but for clearness the shock absorber is omitted from this view.
Figure 5:
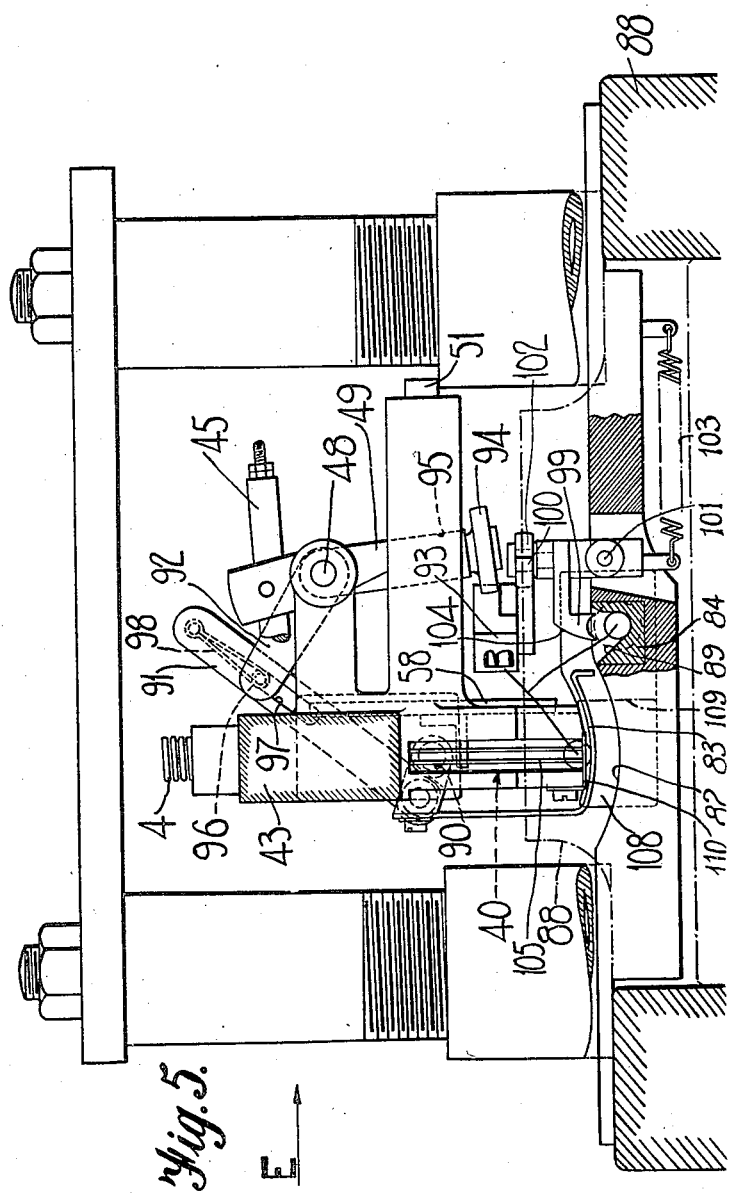
Figure 5 is an elevation of Figure 4 taken in the direction of the arrow D, parts being broken away or omitted.

In Figures 4 to 6, which show the application of the invention to a bullet rectifying machine, parts already described with reference to Figures 1 to 3 are marked with the same numerals and are not further described except where slight differences in construction or operation occur. The bullets which are to be fed to the rectifying machine are fed from a hopper as described with reference to Figures 1 to 3 into the downwardly directed guide-passage 4 in which a bullet moves down with its larger end foremost. In the present case the hopper drive pulley 73, Figure 4, is driven from the crankshaft of the rectifying machine.

At the lower end of the flexible tube the fixed guide 40 is arranged as before to deflect the falling bullets into a horizontal plane. In Figure 5 the bracket 43 containing this passage is shown partly in section for clearness. The falling bullets are delivered as described in detail later lengthwise to an arcuate support 82 from which they are moved laterally by a pusher-element 83 being controlled and guided by a guide 108. Another guide 109, Figure 6, is provided to form the arcuate support into a channel at this position. To prevent damage to the rectifying machine in case a bullet is fed to the support 82 point first, instead of base first (which happens on rare occasions), a small angle plate 110 is provided which is shaped as shown in Figure 7. It will be seen from this figure that unless the bullet is lying in the proper direction it cannot pass by this plate and only its base will fall on to the arcuate support. Thus an obstruction is offered to the movement of the pusher 83 and an interrupter device described later is caused to operate and stop the movement of the part 83.

At the end of the lateral movement a bullet becomes disposed in a groove in a support 84 in the manner described below and in front of a plunger 85 which comprises a punch 86. The punch is arranged to move the bullet lengthwise from the support 84 and through a die 87 which rectifies the bullet to the desired size. It is essential that the bullets shall be accurately aligned with the punch and die, because if the bullets are not accurately aligned there is a great likelihood of the punch or the die or both, or of other parts of the machine, becoming damaged due to the bullets not being properly pressed into the die but due to the rate of feeding, the bullets sometimes tend to be not quite accurately aligned with the punch and die.

The die 87 is rigidly secured to the bed 88 of the machine. The bed is shown partly in section and partly as a chain line in Figure 5 to avoid obscuring other parts. Any suitable mechanism is provided to reciprocate the punch in the direction of the arrow, Figure 4.

The arcuate surface of the support 82 is connected with the groove in the support 84 above referred to, by a downwardly directed sloping surface 89. The distance between the top of the sloping surface and the bottom of the groove is such that when one bullet is resting in the groove there is just sufficient room to support a further bullet if the latter is resting on the sloping surface and against the bullet already in the groove. During the working of the apparatus, however, there will not be a bullet resting against the sloping surface while there is one in the groove.

Above the arcuate surface there is arranged the pivoted pusher 83 which is pivoted at 90 and thus moves in an arcuate path. The pusher 83 is arranged to move bullets in succession from the arcuate surface of the support 82 into the groove of the support 84. The bullets are delivered from the guide-passage 40 and fall on to the upper surface of the pusher-element 83 while the latter is disposed above the arcuate surface, see Figure 5 where a bullet thus supported is shown. On the return movement of the pusher-element the bullet supported thereby is permitted to fall on to the arcuate surface of the support 82 and on the next forward movement of the pusher-element the bullet is moved laterally into the groove of the support 84. The pusher-element is oscillated about its pivot 90 by a link 91 which is connected with a lever 92 mounted on a spindle 48 which latter is oscillated by means of a plate cam 93 fixed to the plunger 85. In Figure 4 part of the cam is shown in chain lines where it is attached to the plunger 85 and the remainder of the cam is shown in full lines to the right of the figure and bracketed thereto. This is because the cam is so positioned that it would cover many parts in the middle of the drawing if shown in its proper place and as drawn it is easier to follow the operation of the machine. The cam reciprocates with the punch and co-operates with a cam-roller 94 supported by an arm 95 secured to the spindle 48 on which the lever 92 is mounted.

The mechanism for operating the pusher-element comprises an interrupter-device which is constructed as follows: The connection between the lever and the pivoted link is effected by a pin 96 which is adapted to move in a slot 97 formed in the link. A spring clip 98 is provided to urge the pin towards the upper end of the slot and a further spring, not shown, is provided to retain the cam-roller 94 in engagement with the cam 93. The purpose of the slot 97 is to provide a safety device whereby the pusher-element is not operated to feed a bullet should the bullet not be properly positioned before the pusher-element to be fed thereby. In such a case, should the free movement of the pusher-element be obstructed, the spring clip 98 retaining the pin against the upper end of the slot opens and permits the pin to move downwardly in the slot and the latter is of such a length that the lever is not depressed by the movement of the pin and so the pusher-element is not operated. The pusher thus remains inoperative until the spring clips connection is restored by the operator.

In an alternative construction an ordinary tension spring may be used instead of the spring clip above described.

In order properly to align the bullet in the groove of the support 84, a locating-device is provided. This device comprises a pivotally mounted member 99 which is shaped to fit over the bullet and operated by a further plate cam 100 movable with the punch. The member 99 is pivoted at 101 and has a cam-roller 102 mounted on it which co-operates with the cam 100. A spring 103 effects the return movement. The arrangement is such that the locating-member is depressed when a bullet has been delivered to the groove and lightly presses upon the bullet to retain it correctly in position in the groove until it is engaged by the punch. By this means, the bullet is accurately located to be pushed by the punch through the die.

The left hand end, Figure 5, of the locating device is so shaped that its extreme end face 104 is concentric with a point slightly above and behind the pivotal axis 101 of the locating-device and it operates to prevent the next bullet from moving into the front of the punch until the locating-device is raised, and owing to the curvature of the end face 104 the latter, as it moves up, allows the next bullet to commence its downward movement. Thus the arm can be moved down again at the earliest possible moment after allowing the bullet to pass beneath it and so an extremely rapid feed and trapping of the bullets can be obtained.

Owing to lubricants which are applied to the bullet-envelopes during manufacture, it is found that variations occur in the rate at which the bullets or envelopes travel down the curved passage 40. In order to reduce such variations to a minimum, the curved surface which deflects the bullets is formed as a pair of guide rails 105, Figures 4 and 5. Preferably these consist of two thin plates, spaced apart by washers 111. If the distance between the plates is considerable, distance pieces may be used instead of the washers, but washers are more convenient where it is desired to make small variations in the distance between the plates. Further washers or distance pieces 112 maintain the thin plates at a suitable distance from the side walls of the bracket 43. The edges of these rails which engage the bullets are narrow and smooth and they also guide the bullets and tend to keep them away from the usual side walls which are provided on either side of the curved surfaces.

It will be seen therefore that by this construction the contact area between the bullets and the curved surface is reduced to a minimum and frictional obstruction caused by the lubricants on the bullets is therefore reduced to a minimum and all the bullets travel on the curved surface at substantially the same speed, which is of course desirable to secure a uniform rate of feeding to the machine receiving the bullets.

The open construction of the rails described above also permits dirt and other foreign matter to fall through the spaces between the rails and the side walls thus enabling an increased output to be obtained by avoiding needless stoppages.

A shock-absorber 56 is disposed in the path of a bullet so as to engage the base thereof as it moves from the passage 40 and across the upper surface of the pusher-element and the shock-absorber determines the position of the bullet on the pusher-element and ensures that the bullet, when it falls from the upper surface of the pusher-element on to the arcuate support 82 is properly positioned to be engaged by the pusher on its next forward movement. The shock-absorber comprises a pivoted depending weight which is adapted to swing under the impact of a bullet striking against it as in the previous example and no further description is necessary. If desired, a counterweight 106 may be provided at the lower end of the depending weight.

If the whole of the base of a bullet is permitted to engage the shock-absorber, it is found that the bullets are sometimes not quite properly positioned by the shock-absorber. This is due to the fact that the bullet-envelope is usually made of a hard metal, such as nickel, and there is some tendency for the bullets to bounce rearwardly from the shock-absorber. The core of the bullet, however, is of a less resilient material, such as lead. To avoid the above mentioned tendency of the bullets to bounce rearwardly from the shock-absorber, the depending weight is provided with a projection 107 which is arranged to engage only the core of a bullet and by this arrangement bullets are almost invariable brought to rest in the desired position.

The projection is of substantially conical shape or is a wedge having a narrow edge, with the point or edge as the case may be directed towards the moving bullets and by reason of this construction the projection is capable of performing a second function which is described below.

It sometimes happens that an empty envelope is included among the bullets which are fed to the pusher-element and it is not desirable that this empty envelope shall be passed to the rectifying die. If an empty envelope is delivered from the fixed guide, it is moved partly over the projection just described. When the pusher-element is moved from beneath the empty envelope, only the nose of the envelope is permitted to fall, since the larger end is held up by the projection. Thus, when the pusher-element moves forward on its next stroke, the envelope obstructs the movement of the pusher-element with the result that the interrupter-device previously described is caused to prevent the full forward movement of the pusher-element. The empty envelope may then be manually removed and the interrupter-device reset so that the feeding-apparatus may continue to work in the normal manner.

In another construction shown in Figure 8 the shock absorber comprises a depending leaf spring 156, the lower end of which is free. The spring is shown on a bracket 58 and positioned to function in the same way as the swinging shock absorber 56, Figure 1.

What we claim as our invention and desire to secure by Letters Patent is:

1. Apparatus for feeding articles, comprising in combination means to cause articles to fall in succession along a path lengthwise down a chute, a stop against which each article is caused to strike, said stop comprising a pivotally depending weight arranged to act as a shock absorber and comprising an end wall of the chute, and means to move each article thereafter between guides in a direction transverse to its axis before the arrival of the next succeeding article.

2. Apparatus for feeding articles, comprising in combination means to cause articles to fall in succession along a path lengthwise down a chute, a stop against which each article is caused to strike, said stop comprising a resiliently mounted member arranged to act as a shock absorber and comprising an end wall of the chute, and means to move each article thereafter between guides in a direction transverse to its axis before the arrival of the next succeeding article.

3. Apparatus for feeding articles, each comprising a shell and an exposed core, said apparatus comprising in combination means to cause articles to fall in succession along a path lengthwise down a chute with the exposed ends of the cores foremost, a stop against which each article is caused to strike, said stop comprising an end wall of the chute, and comprising a shock absorber shaped to engage the cores of the oncoming articles, and means to move each article thereafter between guides in a direction transverse to its axis before the arrival of the next succeeding article.

4. Apparatus for feeding articles, each comprising a shell and an exposed core, said apparatus comprising in combination means to cause articles to fall in succession along a path lengthwise down a chute with the exposed ends of the cores foremost, a stop against which each article is caused to strike, said stop comprising a pivotally depending weight so shaped as to engage the cores of oncoming articles and to act as a shock absorber and comprising an end wall of the chute, and means to move each article thereafter between guides in a direction transverse to its axis before the arrival of the next succeeding article.

5. Apparatus for feeding articles, each comprising a shell and an exposed core, said apparatus comprising in combination means to cause articles to fall in succession along a path lengthwise down a chute with the exposed ends of the cores foremost, a stop against which each article is caused to strike, said stop comprising a pivotally depending weight having a portion of tapering form to engage the cores of oncoming articles and to act as a shock absorber and comprising an end wall of the chute, and means to move each article thereafter between guides in a direction transverse to its axis before the arrival of the next succeeding article.

6. Apparatus for feeding articles, each comprising a shell and an exposed core, said apparatus comprising in combination means to cause articles to fall in succession along a path lengthwise down a chute with the exposed ends of the cores foremost, means to move each article thereafter between guides in a direction transverse to its axis before the arrival of the next succeeding article, and a stop against which each article is caused to strike, said stop comprising a pivotally depending weight so shaped as to engage the cores of oncoming articles and to act as a shock absorber and to enter the shell of any incomplete article to hold the latter out of alignment with the said guides and comprising an end wall of the chute.

7. Apparatus for feeding articles, comprising in combination means to cause articles to fall in succession along a path lengthwise down a chute, a stop against which each article is successively caused to strike, said stop comprising a shock absorber and an end wall of the chute, means to move each article thereafter between guides in a direction transverse to its axis before the arrival of the next succeeding article, said means comprising a pusher-element arranged to move each article in a direction transverse to its axis and an interrupter-device arranged to prevent the full feeding movement of the pusher-element should an article be out of alignment with the said guides, said interrupter-device comprising a coupling arranged to yield or break when the feeding movement of the pusher-element is obstructed.

8. Apparatus for feeding articles, each comprising a shell and an exposed core, said apparatus comprising in combination means to cause articles to fall in succession along a path lengthwise down a chute with the exposed ends of the cores foremost, a stop against which each article is caused to strike, said stop comprising an end wall of the chute, and comprising a shock absorber shaped to engage the cores of the oncoming articles, means to move each article thereafter between guides in a direction transverse to its axis before the arrival of the next succeeding article, said means comprising a pusher-element arranged to move each article in a direction transverse to its axis, and an interrupter device arranged to prevent the full feeding movement of the pusher-element should an article be out of alignment with the said guides, said interrupter-device comprising a coupling arranged to yield or break when the feeding movement of the pusher-element is obstructed.

9. Apparatus for feeding articles, each comprising a shell and an exposed core, said apparatus comprising in combination means to cause articles to fall in succession along a path lengthwise down a chute with the exposed ends of the cores foremost, a stop against which each article is caused to strike, said stop comprising a pivotally depending weight so shaped as to engage the cores of oncoming articles and to act as a shock absorber and comprising an end wall of the chute, means to move each article thereafter between guides in a direction transverse to its axis before the arrival of the next succeeding article, said means comprising a pusher-element arranged to move each article in a direction transverse to its axis, and an interrupter device arranged to prevent the full feeding movement of the pusher-element should an article be out of alignment with the said guides, said interrupter-device comprising a coupling arranged to yield or break when the feeding movement of the pusher-element is obstructed.

10. Apparatus for feeding articles, each comprising a shell and an exposed core, said apparatus comprising in combination means to cause articles to fall in succession along a path lengthwise down a chute with the exposed ends of the cores foremost, means to move each article thereafter between guides in a direction transverse to its axis before the arrival of the next succeeding article, said means comprising a pusher-element arranged to move each article in a direction transverse to its axis, a stop at the end of said path and against which each article is caused to strike, said stop comprising a pivotally depending weight so shaped as to engage the cores of oncoming articles and to act as a shock absorber and to enter the shell of any incomplete article to hold the latter out of alignment with the said guides and comprising an end wall of the chute, and an interrupter device arranged to prevent the full feeding movement of the pusher-element should an article be out of alignment with the said guides, said interrupter-device comprising a coupling arranged to yield or break when the feeding movement of the pusher-element is obstructed.

11. Apparatus for feeding articles comprising in combination means to cause articles to fall in succession along a path lengthwise down a chute, a stop at the bottom of said chute against which each article is successively caused to strike, said stop comprising a shock absorber and an end wall of the chute, mean to move each article thereafter between guides in a direction transverse to its axis before the arrival of the next succeeding article, said means comprising a pusher-element arranged to move each article in a direction transverse to its axis, a support for articles which have been so moved, an interrupter device arranged to prevent the full feeding movement of the pusher-element should an article be out of alignment with the said guides, said interrupter-device comprising a coupling arranged to yield or break when the feeding movement of the pusher-element is obstructed, a plunger arranged to forward an article on the support and to move over the support in timed relationship with the pusher-element, and locating means adapted to be operated in timed relationship with said plunger, positively and accurately to locate an article in the path of the plunger by engaging the article and holding it against the support.

12. Apparatus for feeding articles, each comprising a shell and an exposed core, said apparatus comprising in combination means to cause articles to fall in succession along a path lengthwise down a chute with the exposed ends of the cores foremost, a stop against which each article is caused to strike, said stop comprising a pivotally depending weight so shaped as to engage the cores of oncoming articles and to act as a shock absorber and comprising an end wall of the chute, means to move each article thereafter between guides in a direction transverse to its axis before the arrival of the next succeeding article, said means comprising a pusher-element arranged to move each article in a direction transverse to its axis, a support for articles which have been so moved, an interrupter device arranged to prevent the full feeding movement of the pusher-element should an article be out of alignment with the said guides, a plunger arranged to forward an article on the support and to move over the support in timed relationship with the pusher-element, and locating means adapted to be operated in timed relationship with said plunger positively and accurately to locate an article in the path of the plunger by engaging the article and holding it against the support.

13. Apparatus for feeding articles, each comprising a shell and an exposed core, said apparatus comprising in combination means to cause articles to fall in succession along a path lengthwise down a chute with the exposed ends of the cores foremost, means to move each article thereafter between guides in a direction transverse to its axis before the arrival of the next succeeding article, said means comprising a pusher-element arranged to move each article in a direction transverse to its axis, a stop at the end of said path and against which each article is caused to strike, said stop comprising a pivotally depending weight so shaped as to engage the cores of oncoming articles and to act as a shock absorber and to enter the shell of any incomplete article to hold the latter out of alignment with the said guides and comprising an end wall of the chute, a support for articles which have been so moved, an interrupter device arranged to prevent the full feeding movement of the pusher-element should an article be out of alignment with the said guides, a plunger arranged to forward an article on the support and to move over the support in timed relationship with the pusher-element, and locating means adapted to be operated in timed relationship with said plunger positively and accurately to locate an article in the path of the plunger by engaging the article and holding it against the support.

14. Apparatus for feeding articles, comprising in combination means to cause articles to fall in succession along a path lengthwise down a chute, comprising a tube and a curved guide comprising thin spaced elements on which the articles are adapted to slide, a stop against which each article is caused to strike, said stop comprising a shock absorber at the end of said guide, and means to move each article thereafter between guides in a direction transverse to its axis before the arrival of the next succeeding article.

15. Apparatus for feeding articles, comprising in combination means to cause articles to fall in succession along a path lengthwise down a chute, comprising a tube and a curved guide comprising thin spaced elements on which the articles are adapted to slide, a stop against which each article is caused to strike, said stop comprising a shock absorber at the end of said guide, and means to move each article thereafter between guides in a direction transverse to its axis before the arrival of the next succeeding article, wherein the thin spaced guides are arranged in openwork formation.

16. Apparatus for feeding articles, comprising in combination means to cause articles to fall in succession along a path lengthwise down a chute, comprising a tube and a curved guide comprising thin spaced elements on which the articles are adapted to slide, a stop against which each article is caused to strike, said stop comprising a shock absorber at the end of said guide, and means to move each article thereafter between guides in a direction transverse to its axis before the arrival of the next succeeding article, wherein the thin spaced guides are arranged in openwork formation and are held in spaced relationship by distance pieces.

17. Apparatus for feeding articles comprising in combination means to cause articles to fall in succession along a path lengthwise down a chute, a stop located at the bottom of the chute and against which each article is caused to strike, said stop comprising a shock absorber and an end wall of the chute, and means to move each article thereafter between guides in a direction transverse to its axis before the arrival of the next succeeding article.

CYRIL BEST.
SAMUEL ROBERT CHOWN.